US012510034B2

(12) United States Patent
Holland (10) Patent No.: US 12,510,034 B2
(45) Date of Patent: Dec. 30, 2025

(54) DUAL LIQUEFIED PETROLEUM GAS VAPOR AND LIQUID INJECTION SYSTEM AND METHOD OF CONTROL

(71) Applicant: Blossman Services, Inc., Ocean Springs, MS (US)

(72) Inventor: Stephen Holland, Fletcher, NC (US)

(73) Assignee: Blossman Services, Inc., Ocean Springs, MS (US)

( * ) Notice: Subject to any disclaimer, the term of this patent is extended or adjusted under 35 U.S.C. 154(b) by 0 days.

(21) Appl. No.: 18/420,420

(22) Filed: Jan. 23, 2024

(65) Prior Publication Data

US 2025/0237179 A1 Jul. 24, 2025

(51) Int. Cl.
*F02D 19/00* (2006.01)
*F02D 41/00* (2006.01)
*F02D 41/30* (2006.01)

(52) U.S. Cl.
CPC ..... *F02D 41/0027* (2013.01); *F02D 41/3082* (2013.01); *F02D 2200/0602* (2013.01)

(58) Field of Classification Search
CPC ............ F02D 41/0027; F02D 41/0025; F02D 19/024; F02D 19/023; F02D 41/30; F02D 2200/0606; F02D 19/0647; F02D 19/0692
See application file for complete search history.

(56) References Cited

U.S. PATENT DOCUMENTS

| 5,150,685 | A | 9/1992 | Porter et al. |
| 5,291,869 | A | 3/1994 | Bennet |
| 5,735,253 | A | 4/1998 | Perotto et al. |
| 8,166,956 | B2 * | 5/2012 | Ulrey ................... F02D 19/081 123/525 |
| 9,255,531 | B2 * | 2/2016 | Zhang .................. B60W 10/10 |
| 2011/0166769 | A1 * | 7/2011 | Buechler ............ F02M 21/0239 701/103 |

(Continued)

FOREIGN PATENT DOCUMENTS

| AU | 2002245945 B2 * | 10/2005 | ............. C10L 1/023 |
| BR | PI0710745 A2 * | 6/2011 | |

(Continued)

OTHER PUBLICATIONS

KR-100310897 English Translation (Year: 2001).*

(Continued)

*Primary Examiner* — Lindsay M Low
*Assistant Examiner* — Teuta B Holbrook
(74) *Attorney, Agent, or Firm* — STERNE, KESSLER, GOLDSTEIN & FOX P.L.L.C.

(57) ABSTRACT

A liquefied petroleum (LP) gas fuel system includes a fuel source to store liquid LP gas and a fuel supply system to draw liquid LP gas from the fuel source and selectively deliver vapor LP gas and liquid LP gas into a plurality of cylinders of an internal combustion engine. The fuel supply system includes a plurality of liquid LP gas injectors, a plurality of vapor LP gas injectors, a fuel pump to drive liquid LP gas fuel from the fuel source to the plurality of liquid injectors, and a fuel pressure regulator to deliver vapor LP gas to the plurality of vapor injectors. The fuel system includes a controller to actuate the fuel pressure regulator to deliver vapor LP gas to the plurality of vapor injectors and actuate the fuel pump to deliver liquid LP gas to the plurality of liquid injectors.

20 Claims, 6 Drawing Sheets

(56) References Cited

U.S. PATENT DOCUMENTS

| | | | | |
|---|---|---|---|---|
| 2012/0060935 A1* | 3/2012 | Carter | ............... | F02D 19/023 |
| | | | | 137/511 |
| 2014/0202429 A1 | 7/2014 | Grant et al. | | |
| 2015/0047350 A1 | 2/2015 | Pursifull | | |
| 2015/0047610 A1* | 2/2015 | Pursifull | ............ | F02D 41/0025 |
| | | | | 123/495 |
| 2015/0053180 A1* | 2/2015 | Pursifull | ............ | F02M 21/0212 |
| | | | | 123/445 |
| 2015/0192450 A1* | 7/2015 | Leone | ............... | G01F 23/804 |
| | | | | 701/102 |
| 2015/0307075 A1* | 10/2015 | Leone | ............... | B60W 10/02 |
| | | | | 123/495 |
| 2015/0322905 A1* | 11/2015 | Dearth | ............... | F02M 33/00 |
| | | | | 123/445 |
| 2018/0298848 A1* | 10/2018 | Ulrey | ............ | F02M 21/0278 |

FOREIGN PATENT DOCUMENTS

| | | | | | |
|---|---|---|---|---|---|
| CN | 101946083 A | * | 1/2011 | ........... | F02D 19/024 |
| CN | 204961094 U | * | 1/2016 | | |
| DE | 102016209195 A1 | * | 12/2016 | ....... | B60K 15/03006 |
| DE | 102016209195 B4 | * | 11/2023 | ....... | B60K 15/03006 |
| KR | 100310897 B1 | * | 10/2001 | | |
| WO | 2013075234 A1 | | 5/2013 | | |

OTHER PUBLICATIONS

Office Action for Canadian Patent Application No. 3,230,878, dated Jul. 18, 2025, Canadian Intellectual Property Office, 5 pages.

* cited by examiner

| Dual Phase LPG Injection | | | | | |
|---|---|---|---|---|---|
| Engine Cold (ECT Below x) | | | Engine Warm (ECT Below x) | | |
| | Liquid Injection | Vapor Injection | | Liquid Injection | Vapor Injection |
| Cold Engine Start | ✓ | | Hot Engine Start | | ✓ |
| Warm Up | ✓ | | Idle (Operating Temperature) | | ✓ |
| Idle (Warm Up) | ✓ | | | | |
| Acceleration (20-60% Load) | ✓ | | Acceleration (20-60% Load) | | ✓ |
| Acceleration (60-90% Load) | ✓ | | Acceleration (60-90% Load) | ✓ | |
| Acceleration (90-100% Load) | ✓ | | Acceleration (90-100% Load) | ✓ | |
| Cruise | ✓ | | Cruise | | ✓ |
| Deceleration | ✓ | | Deceleration | | ✓ |
| Deceleration FCO | | | Deceleration FCO | | |
| LPG Tank Liquid Level Below 20% | | ✓ | LPG Tank Liquid Level Below 20% | | ✓ |
| LPG Tank Pressure Above "x" | | ✓ | LPG Tank Pressure Above "x" | | ✓ |

FIG. 5

FIG. 6

DUAL LIQUEFIED PETROLEUM GAS VAPOR AND LIQUID INJECTION SYSTEM AND METHOD OF CONTROL

BACKGROUND

Field

The disclosure relates to systems and methods for dual vapor and liquid phase liquefied petroleum gas injection system for vehicles.

Background

Liquefied petroleum (LP) gas vehicles have been used for decades as an alternative to traditionally gasoline-powered vehicles due to the higher octane rating of LP gas. LP gas predominantly consists of butane and propane and is stored as a liquid at higher pressures. LP gas (i.e., autogas) engine systems conventionally fall into one of two categories: liquid LP gas injection and vapor LP gas injection. Each has their own unique strengths and weaknesses.

Liquid LP gas injection systems may use LP gas fuel, rather than traditional gasoline, in most temperature conditions, including during a cold engine start. Because liquid LP gas is denser than vapor LP gas, significantly less air is displaced from the engine's combustion chamber during injection intake, thereby ensuring that the combustion chamber receives proper air charge. Accordingly, liquid LP gas injection systems are volumetrically more efficient than vapor LP gas injection systems, particularly when operating at high engine speeds.

But liquid LP gas injection systems suffer several drawbacks, such as unintended vaporization of liquid LP gas in the fuel rail at the supply side of fuel injectors, potentially causing a lean combustion event.

Liquid LP gas injection systems must flush out vapor LP gas in the fuel rail by returning unused fuel back to the vehicle fuel tank via a return line, which can elevate pressure in the fuel tank near its maximum allowable working pressure (e.g., 312 psig in U.S. autogas tanks). Consequently, refueling is suspended until the tank has cooled, posing a problem for freight or service vehicles that run multiple shifts.

Liquid LP gas injection systems typically need to flush all of the vapor from the fuel supply system prior to cranking the engine after a hot soak-when radiant heat from the engine during shut down causes the liquid propane in the fuel supply system to boil and vaporize, which pushes all of the liquid LP gas from the fuel supply lines and rails back into the storage tank. Flushing can take several minutes, during which the vehicle ignition is on and the vehicle operator must wait before the vehicle is able to run.

Another problem with liquid LP gas injection systems is that the fuel pumps can experience failure due to overheating when liquid levels in the storage tank are low.

Another problem with liquid LP gas injection systems is that the rapid evaporation of the fuel which takes place intake manifold can cause damage to engine components from inadvertent ice formation caused by flash freezing of humidity in the air intake.

Vapor LP gas injection systems avoid many of these reliability and durability problems, such as pump failure and flushing, associated with liquid LP gas injection systems. Avoiding the use of a pump, vapor LP gas injection systems rely on a fuel pressure regulator, also known as a vaporizer, to vaporize liquid LP gas drawn from the storage tank. The vaporizer, however, requires significant heat to vaporize the fuel in the quantity needed to supply engines used in the transportation industries. Vaporizers typically use engine coolant to supply the heat absorbed by the vaporization process. For the engine coolant used by the vaporizer to have sufficient heat, the engine must be running well into its warm up phase and near operating temperature. Up to this point, vapor LP gas operation is not advised (due to the potential for freezing the regulator), so gasoline operation is used until the warm up threshold is reached (typically about 30° C. to 50° C.). In colder climates, undesirable reliance on gasoline operation is needed, leading to higher emissions.

In a vapor LP gas injection system, the fuel is injected as a vapor into the intake port of each cylinder. The injected fuel vapor displaces some of the air which could otherwise be drawn into the cylinder. At higher engine speeds and engine loads, this displacement of available air has a negative impact on the cylinders' ability to breathe and acquire complete air charges, resulting in a loss in volumetric efficiency.

Accordingly, there is a need for a LP gas injection system that can selectively deliver both vapor and liquid LP gas into the engine at particular operating conditions to improve engine efficiency, eliminate reliance on gasoline for cold starting an engine, and stabilize tank pressure to avoid reliability problems.

BRIEF SUMMARY

The present disclosure includes embodiments of liquefied petroleum (LP) gas fuel systems for an internal combustion engine of a vehicle.

In some embodiments, the LP gas fuel system includes a fuel tank configured to store liquid LP gas. In some embodiments, the LP gas fuel system includes a fuel supply system configured to draw liquid LP gas from the fuel tank and deliver vapor LP gas and liquid LP gas into a plurality of cylinders of the internal combustion engine. In some embodiments, the fuel supply system includes a plurality of liquid injectors each configured to inject liquid LP gas into a respective cylinder of the internal combustion engine. In some embodiments, the fuel supply system includes a plurality of vapor injectors each configured to inject vapor LP gas into a respective cylinder of the internal combustion engine. In some embodiments, the fuel supply system includes a fuel pump configured to displace liquid LP gas fuel from the fuel tank to the plurality of liquid injectors. In some embodiments, the fuel supply system includes a fuel pressure regulator configured to adjust the pressure of liquid LP gas released from the fuel tank such that the released liquid LP gas is converted to vapor LP gas. In some embodiments, the fuel pressure regulator is configured to deliver vapor LP gas to the plurality of vapor injectors. In some embodiments, the LP gas fuel system includes an engine coolant temperature sensor configured to indicate a temperature measurement of an engine coolant line. In some embodiments, the LP gas fuel system includes a controller configured to determine a load demand of the internal combustion engine and receive the temperature measurement of the engine coolant line from the engine coolant temperature sensor. In some embodiments, the controller is configured to actuate the fuel pressure regulator to deliver vapor LP gas to the plurality of vapor injectors and actuate the fuel pump to deliver liquid LP gas to the plurality of liquid injectors. In some embodiments, the controller is configured to selectively actuate the fuel pressure regulator and the fuel pump based on at least one of the load demand of the internal combustion engine and the temperature measurement of the engine coolant line.

In some embodiments, the controller is configured to actuate the fuel pump to deliver liquid LP gas to the plurality of liquid injectors when the temperature measurement of the engine coolant line is below an engine coolant temperature threshold. In some embodiments, the controller is configured to actuate the fuel pressure regulator to deliver vapor LP gas to the plurality of vapor injectors when the temperature measurement of engine coolant line is above the engine coolant temperature threshold.

In some embodiments, the fuel supply system further includes a first fuel rail coupled to the plurality of liquid injectors. In some embodiments, the fuel supply system includes a second fuel rail coupled to the plurality of vapor injectors.

In some embodiments, the fuel tank includes a single fuel tank. In some embodiments, the fuel supply system includes a first fuel supply line fluidly coupled to the fuel tank and to first fuel rail. In some embodiments, the fuel pump is configured to displace liquid LP gas through the first fuel supply line. In some embodiments, the fuel supply system includes a second fuel supply line fluidly coupled to the fuel tank and to the second fuel rail. In some embodiments, the fuel pressure regulator is coupled to the second fuel supply line.

In some embodiments, the fuel supply system includes a return fuel line fluidly coupled to the first fuel rail and the fuel tank.

In some embodiments, the fuel tank includes a first fuel tank configured to store liquid LP gas and a second fuel tank configured to store liquid LP gas. In some embodiments, the fuel supply system includes a first fuel supply line fluidly coupled to the first fuel tank and to first fuel rail. In some embodiments, the fuel pump is configured to displace liquid LP gas through the first fuel supply line. In some embodiments, the fuel supply system includes a second fuel supply line fluidly coupled to the second fuel tank and to the second fuel rail. In some embodiments, the fuel pressure regulator is coupled to the second fuel supply line.

In some embodiments, the fuel supply system includes a return fuel line fluidly coupled to the first fuel rail and the first fuel tank.

In some embodiments, the engine coolant temperature sensor is disposed at the fuel pressure regulator or at one of the plurality of cylinders of the internal combustion engine.

In some embodiments, the controller is configured to actuate the fuel pump to deliver liquid LP gas to the plurality of liquid injectors when the load demand is above an engine load threshold. In some embodiments, the controller is configured to actuate the pressure regulator to deliver vapor LP gas to the plurality of vapor injectors when the load demand is below the engine load threshold.

In some embodiments, the fuel pump is disposed in the fuel tank.

In some embodiments, the fuel system includes a fuel level sensor disposed in the fuel tank. In some embodiments, the fuel level sensor is configured to indicate a fuel level measurement of liquid LP gas in the fuel tank.

In some embodiments, the controller is configured to receive the fuel level measurement of liquid LP gas in the fuel tank from the fuel level sensor. In some embodiments, the controller is configured to selectively actuate based on the fuel level measurement: (1) the fuel pump to deliver liquid LP gas to the plurality of liquid injectors, and (2) the fuel pressure regulator to deliver vapor LP gas to the plurality of vapor injectors.

In some embodiments, the controller is configured to actuate the fuel pump to deliver liquid LP gas to the plurality of liquid injectors when the fuel level measurement is above a fuel level threshold. In some embodiments, the controller is configured to actuate the fuel pressure regulator to deliver vapor LP gas to the plurality of vapor injectors when the fuel level measurement is below fuel level threshold.

The present disclosure includes embodiments of methods for delivering liquefied petroleum (LP) gas to an internal combustion engine of a vehicle. In some embodiments, the method includes a step of activating a fuel pump to deliver liquid LP gas through a first fuel supply line. In some embodiments, the method includes a step of activating a fuel pressure regulator to adjust the pressure of liquid LP gas in a second fuel supply line such that the liquid LP gas in the second fuel supply line is converted to vapor LP gas. In some embodiments, the method includes a step of detecting an operating condition of the vehicle. In some embodiments, the method includes a step of actuating, based on the detected operating condition of the vehicle, at least one of: (1) the fuel pump to deliver liquid LP gas to a liquid injector to inject liquid LP gas into a cylinder of the internal combustion engine, and (2) the fuel pressure regulator to deliver vapor LP gas to a vapor injector to inject vapor VP gas into the cylinder of the internal combustion engine. In some embodiments, the operating condition of the vehicle includes at least one of a load demand of the internal combustion engine, a temperature measurement of an engine coolant line, and a fuel level measurement of liquid LP gas in a fuel tank of the vehicle.

In some embodiments, the step of detecting the operating condition indicates that the temperature measurement of the engine coolant line is below a coolant temperature threshold, and the step of actuating at least one of the fuel pump and the fuel pressure regulator includes actuating the fuel pump to deliver liquid LP gas to the liquid injector.

In some embodiments, the step of detecting the operating condition indicates that the temperature measurement of the engine coolant line is above a coolant temperature threshold, and the step of actuating at least one of the fuel pump and the fuel pressure regulator includes actuating the fuel pressure regulator to deliver vapor LP gas to the vapor injector.

In some embodiments, the step of detecting the operating condition indicates that the load demand is above an engine load threshold, and the step of actuating at least one of the fuel pump and the fuel pressure regulator includes actuating the fuel pump to deliver liquid LP gas to the liquid injector.

In some embodiments, the step of detecting the operating condition indicates that the load demand is below an engine load threshold, and the step of actuating at least one of the fuel pump and the fuel pressure regulator includes actuating the fuel pressure regulator to deliver vapor LP gas to the vapor injector.

In some embodiments, the step of detecting the operating condition indicates that the fuel level measurement is above a fuel level threshold, and the step of actuating at least one of the fuel pump and the fuel pressure regulator includes actuating the fuel pump to deliver liquid LP gas to the liquid injector.

In some embodiments, the step of detecting the operating condition indicates that the fuel level measurement is below a fuel level threshold. In some embodiments, the step of actuating at least one of the fuel pump and the fuel pressure regulator includes actuating the fuel pressure regulator to deliver vapor LP gas to the vapor injector.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

The present disclosure will be described with reference to the accompanying drawings. In the drawings, like reference numbers indicate identical or functionally similar elements.

DETAILED DESCRIPTION

The following Detailed Description refers to accompanying drawings to illustrate embodiments consistent with the disclosure. References in the Detailed Description to "one embodiment," "an embodiment," "some embodiments," "certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is within the knowledge of those skilled in the relevant art(s) to affect such feature, structure, or characteristic in connection with other embodiments whether or not explicitly described.

In the context of the present disclosure, the term "connected" can refer to a direct connection between two elements without any intervening components or an indirect interconnection with the presence of intervening components between the connected elements. For example, a fuel line can be connected to a fuel tank by coupling a fitting of the fuel line directly to the port of the source tank or coupling the fitting of the fuel line indirectly to a port via an intermediate component, such as a pressure regulator, whereby the direct and indirect interconnections both establish fluid communication between the fuel tank and the fuel line.

The following Detailed Description of the embodiments reveals the general nature of the disclosure so that others can, by applying knowledge of those skilled in the relevant art(s), readily modify and/or adapt for various applications such embodiments, without undue experimentation, without departing from the spirit and scope of the disclosure. Therefore, such adaptations and modifications are intended to be within the meaning and plurality of equivalents of the embodiments based upon the teaching and guidance presented herein. It is to be understood that the phraseology or terminology herein is for the purpose of description and is to be interpreted by those skilled in relevant art(s) in light of the teachings herein.

While liquid LP gas-powered vehicles and vapor LP gas-powered vehicles have been used as an alternative to traditionally gasoline-powered vehicles, both liquid LP gas fuel supply systems and vapor LP gas fuel supply systems have drawbacks. Liquid LP gas fuel supply systems typically experience unintended vaporization of liquid LP gas in the fuel rail, leading to loss of accurate fuel control and inefficient combustion. Liquid LP gas fuel systems can suffer from potential overheating of the fuel pump when fuel tank levels are low. Liquid LP gas fuel supply systems also require a fuel pump to flush out vapor LP gas from the fuel supply system, particularly when the vehicle is started under warm conditions, thereby delaying the start of engine operation.

Although vapor LP gas fuel supply systems do not require a pump to flush gas from the fuel supply system, vapor LP gas fuel has difficulties operating when the engine is started in cold conditions, leading to undesired use of gasoline to start the engine. Because vapor LP gas fuel supply systems displace air charge from reaching the combustion chambers, the efficiency of vapor LP gas-powered engines drops during high load demand conditions, such as when the vehicle is accelerating at a high rate.

The present disclosure presents vehicle fuel systems that overcome limitations of known systems and methods by providing the vehicle fuel system independent vapor and liquid LP gas fuel delivery systems. The disclosed vehicle fuel systems can include a fuel tank, a plurality of liquid fuel injectors, a plurality of vapor fuel injectors, a fuel pump to displace liquid LP gas fuel from the fuel tank to the plurality of liquid fuel injectors, and a fuel pressure regulator to deliver vapor LP gas to the plurality of vapor fuel injectors. The fuel systems can include a controller to actuate the fuel pressure regulator to deliver vapor LP gas to the plurality of vapor fuel injectors and actuate the fuel pump to deliver liquid LP gas to the plurality of liquid fuel injectors. The controller can be configured to selectively actuate the fuel pressure regulator and the fuel pump based on one or more operating conditions of the vehicle, including the engine coolant temperature, an engine load, and a level of liquid LP gas stored in a fuel tank.

Figure 1:
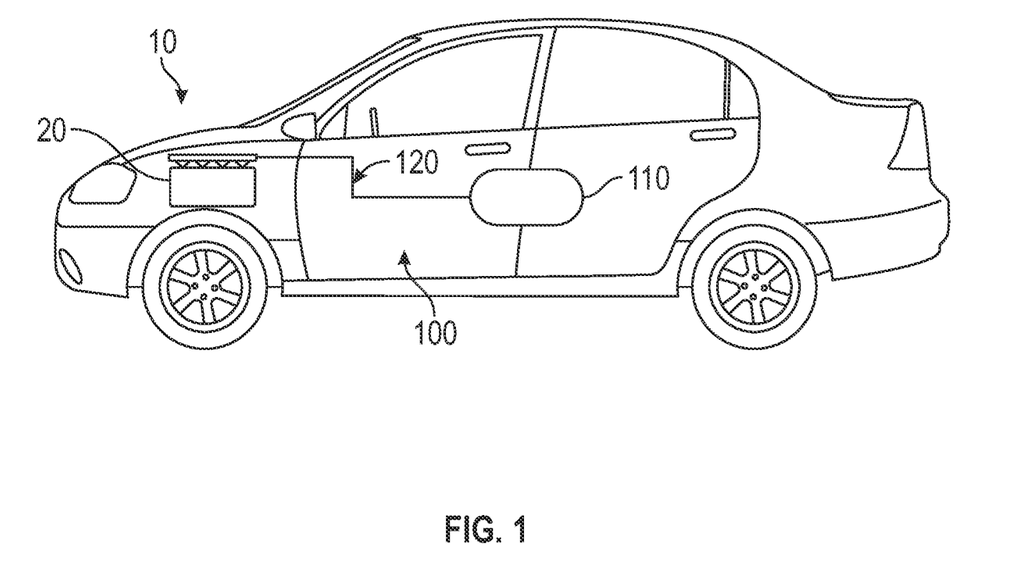
FIG. 1 is a schematic diagram illustrating a vehicle including a fuel system with a fuel source and a fuel supply system, according to embodiments of the present disclosure.

Embodiments will now be described in more detail with reference to the figures. Referring to FIG. 1, for example, a vehicle 10 may include an internal combustion engine 20 configured to operate on LP gas fuel. In some embodiments, vehicle 10 may be an automobile, a bus, a truck, a freight carrier, an off-road vehicle, a watercraft, or some other vehicle.

In some embodiments, vehicle 10 may include a fuel system 100 for storing and delivering LP gas fuel to the internal combustion engine 20 of vehicle 10. In some embodiments, fuel system 100 may include a fuel source 110 (e.g., one or more fuel tanks) for storing liquid LP gas fuel. In some embodiments, fuel system 100 may include a fuel supply system 120 for drawing liquid LP gas from fuel source 110 and selectively delivering vapor LP gas and liquid LP gas into a plurality of cylinders of the internal combustion engine 20. In some embodiments, internal combustion engine 20 can be a direct injection spark ignition engine 20, in which fuel supply system 120 is configured to inject fuel directly into the cylinders of engine 20.

Figure 2:
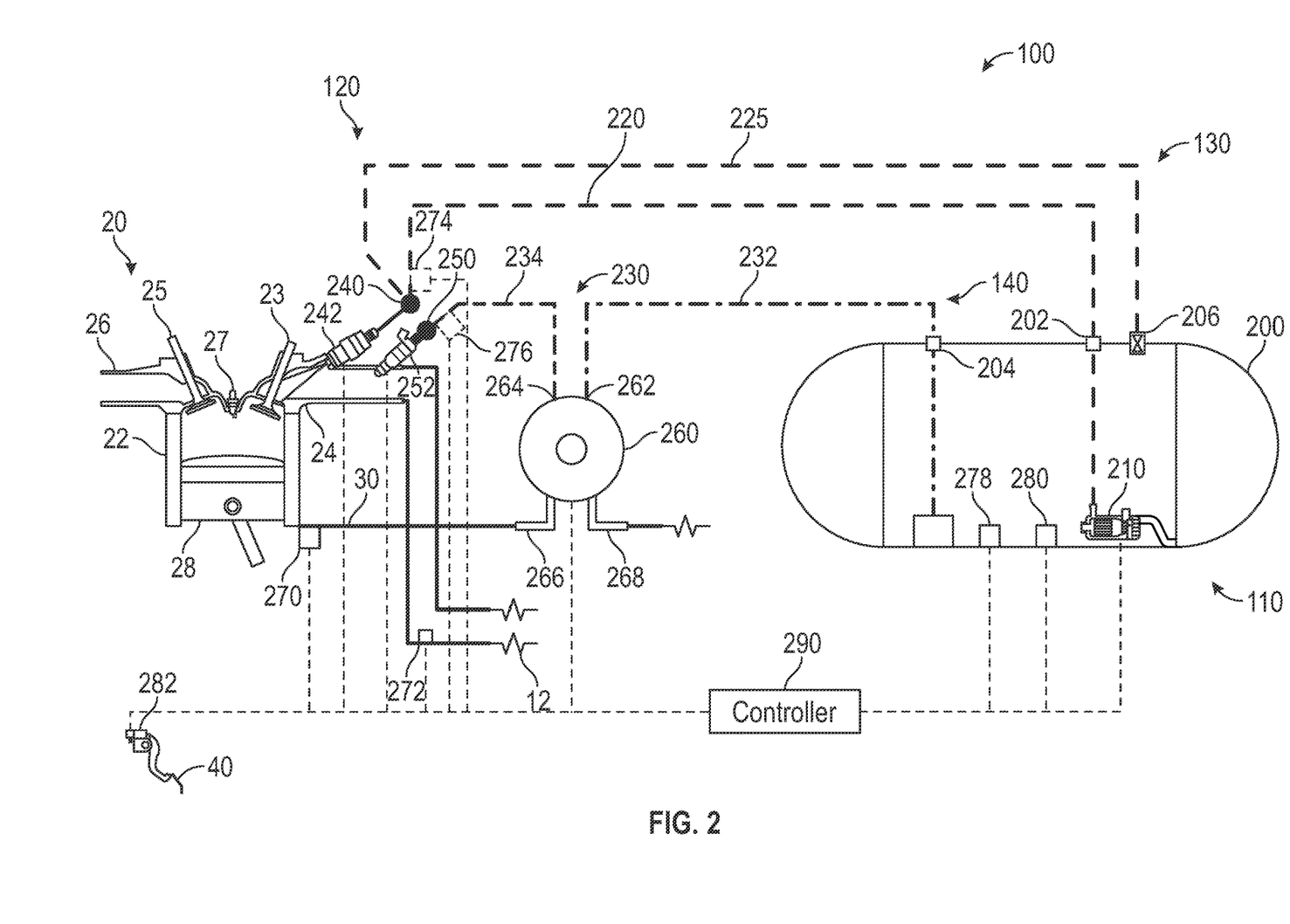
FIG. 2 is a schematic diagram illustrating a fuel supply system, according to embodiments of the present disclosure.
Figure 3:
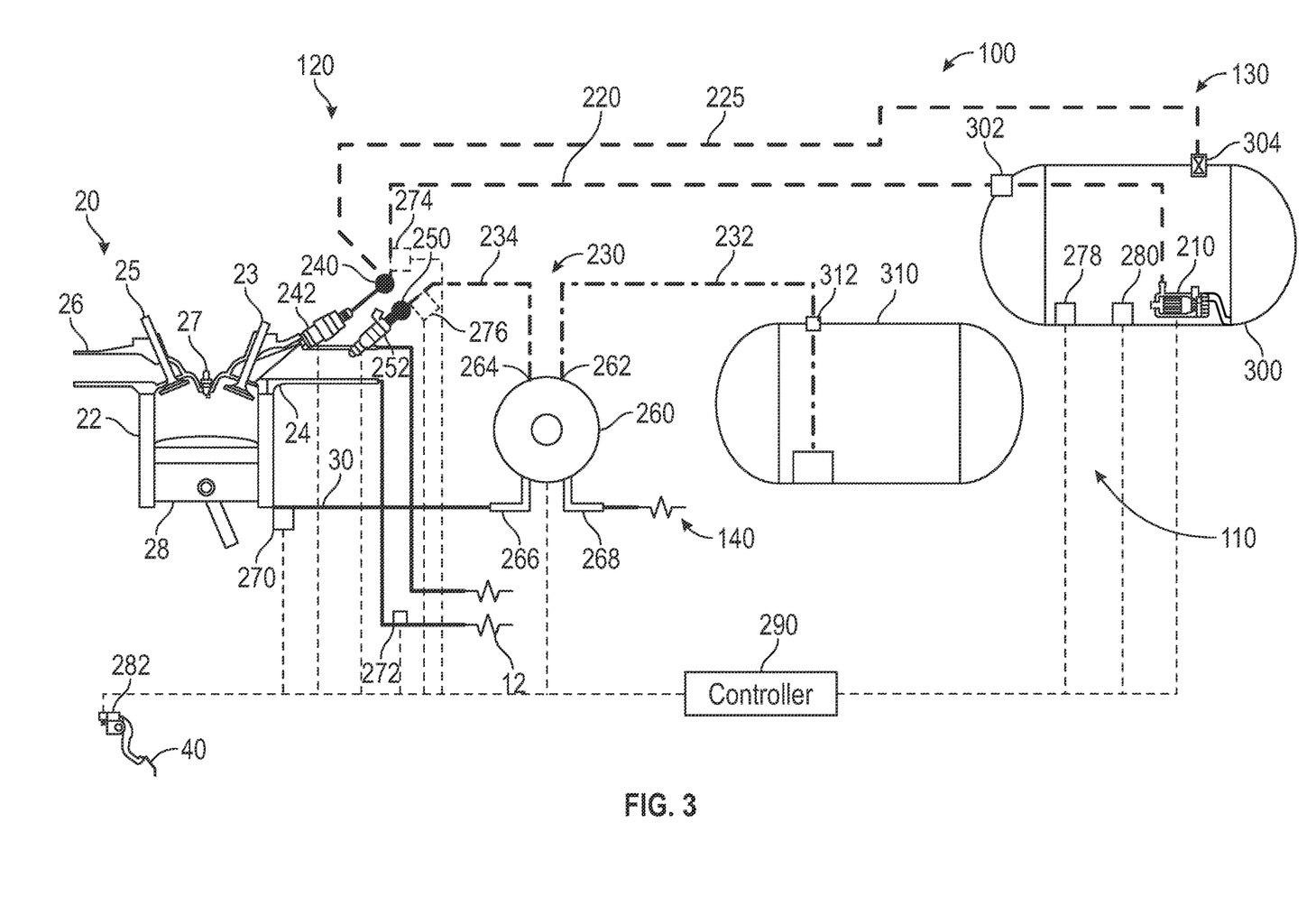
FIG. 3 is a schematic diagram illustrating a fuel supply system, according to embodiments of the present disclosure.

FIGS. 2 and 3 show example schematic diagrams of fuel system 100 for storing and delivering both liquid and vapor LP gas to engine 20 according to embodiments of the present disclosure. In some embodiments, as shown in FIGS. 2 and 3, engine 20 can include one or more combustion chambers 22 coupled to an intake port 24 via an intake valve 23 and coupled to an exhaust port 26 via an exhaust valve 25. In some embodiments, each combustion chamber 22 can include a reciprocating piston 28 and spark plug 27. In some embodiments, intake port 24 of each combustion chamber 22 can be coupled to an intake manifold 12 of vehicle 10 to receive air intake. In some embodiments, engine 20 can include an engine coolant line 30 configured to absorb heat from the one or more combustion chambers 22.

Fuel source 110 of fuel system 100 can have a single fuel tank (e.g., vehicle fuel tank 200 shown in FIG. 2) or multiple fuel tanks (e.g., first and second vehicle fuel tanks 300 and 310 shown in FIG. 3). Fuel supply system 120 of fuel system 100 can have two independent fuel delivery systems: a liquid fuel delivery system 130 dedicated to delivering and injecting liquid LP gas fuel, and a vapor fuel delivery system 140 dedicated to delivering and injecting vapor LP gas fuel. Liquid fuel delivery system 130 can be configured to deliver and inject liquid LP gas fuel into the one or more combustion chambers 22 without drawing any fuel from vapor fuel delivery system 140. Vapor fuel delivery system 140 can be configured to deliver and inject vapor LP gas fuel into the one or more combustion chambers 22 without drawing any fuel from liquid fuel delivery system 130.

In some embodiments, as shown in FIG. 2, fuel source 110 can include a vehicle fuel tank 200 configured to store LP gas both in a vapor state and a liquid state such that liquid LP gas is stored in a range from 0 psig (−42° C.) to about 305 psig (62° C.), such as, for example 150 psig. In some embodiments, vehicle fuel tank 200 can include one or more impermeable shells formed of a material, such as steel or aluminum, suitable for storing and transferring a fuel, such as LP fuel at a liquid state. In some embodiments, vehicle fuel tank 200 is the only fuel tank of fuel source 110. In some embodiments, fuel source 110 can include one or more auxiliary fuel tanks connected to vehicle fuel tank 200 to replenish fuel in vehicle fuel tank 200.

Vehicle fuel tank 200 can be coupled to both liquid fuel delivery system 130 and vapor fuel delivery system 140. For example, in some embodiments, vehicle fuel tank 200 can include a first outlet port 202 configured to direct liquid LP gas fuel from vehicle fuel tank 200 to liquid fuel delivery system 130. Vehicle fuel tank 200 can include a second outlet port 204 configured to direct liquid LP gas fuel from vehicle fuel tank 200 to vapor fuel delivery system 140. First outlet port 202 can be in fluid communication with a liquid displacement device (e.g., pump 210) housed in vehicle fuel tank 200 to direct stored liquid LP gas fuel to liquid fuel delivery system 130 at pressures higher than the internal pressure of vehicle fuel tank 200. Because the operating pressures of vapor fuel delivery system 140 are lower than the internal pressure of vehicle fuel tank 200, second outlet port 204 can direct fuel to vapor fuel delivery system 140 without being in communication with a liquid displacement device housed in vehicle fuel tank 200.

In some embodiments, vehicle fuel tank 200 can include a tank return port 206 configured to receive fuel that was supplied from the vehicle fuel tank 200 and not ignited by engine 20. In some embodiments, tank return port 206 can include a fixed orifice to control the pressure of LP gas returned back to vehicle fuel tank 200.

In some embodiments, as shown in FIG. 3, fuel source 110 can include a first vehicle tank 300 and a second fuel vehicle tank 310. Similar to vehicle fuel tank 200, first and second vehicle tanks 300 and 310 shown in FIG. 3 can each be configured to store LP gas both in a vapor state and a liquid state such that liquid LP gas is stored in a range from 0 psig (−42° C.) to about 305 psig (62° C.), such as, for example 150 psig.

In some embodiments, first vehicle tank 300 can be dedicated to storing fuel for only liquid fuel delivery system 130. For example, first vehicle tank 300 can include an outlet port 302 configured to direct liquid LP gas fuel from vehicle fuel tank 300 to liquid fuel delivery system 130. Similar to first outlet port 202 of vehicle fuel tank 200, outlet port 302 of vehicle fuel tank 300 can be in fluid communication with a liquid displacement device (e.g., pump 210) housed in vehicle fuel tank 300 to direct stored liquid LP gas fuel to liquid fuel delivery system 130. Vehicle fuel tank 300 can include a tank return port 304 configured to receive fuel that was supplied from the vehicle fuel tank 300 and not ignited by engine 20.

In some embodiments, second vehicle fuel tank 310 can be dedicated to storing fuel only for vapor fuel delivery system 140. Second vehicle fuel tank 310 can include an outlet port 312 configured to direct liquid and/or vapor LP gas fuel from vehicle fuel tank 200 to vapor fuel delivery system 140. Similar to second outlet port 204 of vehicle fuel tank 200, outlet port 312 of second vehicle fuel tank 310 can direct fuel to vapor fuel delivery system 140 without being in communication with a liquid displacement device housed in second fuel tank 310.

In some embodiments, fuel supply system 120 can include a fuel pump 210 configured to displace liquid LP gas fuel stored in vehicle fuel tank 200 to engine 20. In some embodiments, fuel pump 210 is disposed within fuel tank 200 and is connected to first outlet port 202 such that fuel pump 210 delivers fuel through first outlet port 202. Fuel pump 210 can be any type of pump suitable for delivering liquid LP gas to engine 20, including, for example, submergible centrifugal pumps, turbine pumps, and sliding vane pumps.

In some embodiments, liquid fuel delivery system 130 can include a first fuel supply line 220 coupled to first outlet port 202 of vehicle fuel tank 200. In some embodiments, first fuel supply line 220 is configured to direct liquid LP gas supplied from the tank outlet port 202 toward engine 20 of vehicle 10. In some embodiments first fuel supply line 220 can include a rigid tube having a metal-based material (e.g., stainless steel, brass, or copper), a flexible hose having a polymer-based material (e.g., neoprene rubber), or a combination thereof.

In some embodiments, vapor fuel delivery system 140 can include a second fuel supply line 230 coupled to second outlet port 204 of vehicle fuel tank 200. In some embodiments, second fuel supply line 230 is configured to direct liquid LP gas fuel supplied from second tank outlet port 204 toward engine 20 of vehicle 10. In some embodiments, second fuel supply line 230 can include a rigid tube having a metal-based material (e.g., stainless steel, brass, or copper), a flexible hose having a polymer-based material (e.g., neoprene rubber), or a combination thereof.

In some embodiments, liquid fuel delivery system 130 can include a first fuel rail 240 coupled to engine 20 and first fuel supply line 220. In some embodiments, first fuel rail 240 is configured to receive liquid LP gas supplied by first fuel supply line 220 and deliver the fuel at a predetermined pressure (e.g., 150 PSI to 450 PSI) to the intake (e.g., fuel injector, intake manifold, combustion chamber of engine cylinder) of engine 20. In some embodiments, first fuel rail 240 can include a tube having a metal-based material, a plastic-based material, or a combination thereof.

In some embodiments, liquid fuel delivery system 130 can include one or more liquid fuel injectors 242 coupled to first fuel rail 240 and in fluid communication with the one or more combustion chambers 22 of engine 20. In some embodiments, each liquid fuel injector 242 is configured to inject a predetermined amount of liquid LP gas into a respective combustion chamber 22 of engine 20. In some embodiments, liquid fuel injector 242 can include an electronic-actuated solenoid valve to control the injection of liquid LP gas into the one or more combustion chambers 22 of engine 20.

In some embodiments, liquid fuel delivery system 130 can include a return line 225 coupled to tank return port 206 and first fuel rail 240 for returning vapor LP gas fuel remaining in fuel rail (e.g., first fuel rail 240) of engine 20 back to vehicle fuel tank 200. In some embodiments, return line 225 can include a rigid tube having a metal-based material (e.g., stainless steel, copper, or brass), a flexible hose having a polymer-based material (e.g., neoprene rubber), or a combination thereof.

In some embodiments, vapor fuel delivery system 140 can include a second fuel rail 250 coupled to engine 20 and second fuel supply line 230. In some embodiments, second fuel rail 250 is configured to receive vapor LP gas supplied by second fuel supply line 230 and deliver the vapor LP gas at a predetermined pressure (e.g., 7.25 psig to 36.26 psig, such as 9 psig to 32 psig) to the intake (e.g., fuel injector, intake manifold, combustion chamber of engine cylinder) of engine 20. In some embodiments, second fuel rail 250 can include a tube having a metal-based material, a plastic-based material, or a combination thereof.

In some embodiments, vapor fuel delivery system 140 can include one or more vapor fuel injectors 252 coupled to second fuel rail 250 and in fluid communication with intake port 24 and/or the one or more combustion chambers 22 of engine 20. In some embodiments, each vapor fuel injector 252 is configured to inject a predetermined amount of vapor LP gas into intake port 24 and/or a respective combustion chamber 22 of engine 20. In some embodiments, vapor fuel injector 252 can include an electronic-actuated solenoid valve to control the injection of vapor LP gas into the intake port 24 and/or the one or more combustion chambers 22 of engine 20.

In some embodiments, vapor fuel delivery system 140 can include a fuel pressure regulator 260 (i.e., a vaporizer) coupled to second fuel supply line 230. In some embodiments, fuel pressure regulator 260 is configured to modify the pressure of fuel in second fuel supply line 230 so that the fuel delivered to second fuel rail 250 is set at a target pressure level (e.g., 7.25 psig to 36.26 psig, such as 9 psig to 32 psig) in which the delivered LP gas is set in a vapor state. In some embodiments, fuel pressure regulator 260 can include an intake port 262 in fluid communication with a first section 232 of second fuel supply line 230 and a discharge port 264 in fluid communication with a second section 234 of second fuel supply line 230 coupled to second fuel rail 250. Fuel pressure regulator 260 can include a valve, such as a solenoid valve, to adjust the pressure or meter the amount of LP gas leaving discharge port 264. In some embodiments, fuel pressure regulator 260 is configured to exchange heat from engine coolant line 30 with liquid LP gas received from intake port 262 to heat and convert liquid LP gas to vapor while maintaining fuel pressure regulator 260 at an operational temperature. In some embodiments, fuel pressure regulator 260 can include an inlet 266 coupled to engine coolant line 30 for receiving heated engine coolant leaving engine 20 and an outlet 268 for discharging engine coolant back to engine coolant line 30.

In some embodiments, fuel system 100 can include a plurality of sensors for measuring and indicating one or more operating conditions of vehicle 10. For example, in some embodiments, fuel system 100 can include an engine coolant sensor 270 coupled to engine coolant line 30 and configured to measure the temperature of engine coolant leaving engine 20. Engine coolant sensor 270 can be any sensor suitable for measuring temperature of engine coolant, such as, for example, a thermistor. In some embodiments, fuel system 100 can include an absolute manifold pressure (MAP) sensor 272 coupled to intake manifold 12 and configured to measure absolute pressure of air in intake manifold 12. In some embodiments, MAP sensor 272 can be any suitable sensor measuring absolute pressure of air in intake manifold 12, for example, a pressure transducer.

In some embodiments, fuel system 100 can include a first fuel rail sensor 274 coupled to first fuel rail 240 and configured to measure the pressure or temperature of liquid LP gas in first fuel rail 240. In some embodiments, fuel system 100 can include a second fuel rail sensor 276 coupled to second fuel rail 250 and configured to measure the pressure or temperature of vapor LP gas in second fuel rail 250. In some embodiments, first and second rail sensors 274 and 276 can include any suitable sensor for measuring pressure or temperature of first and second fuel rails 240 and 250, for example, a piezoelectric or thermistor sensor.

In some embodiments, fuel system 100 can include a fuel level sensor 278 disposed in vehicle fuel tank 200 and configured to measure a fuel level of liquid LP gas stored in vehicle fuel tank 200. Fuel level sensor 278 can be any suitable sensor for measuring fuel level, for example, a float-style fuel level sensor or a capacitance fuel level sensor. In some embodiments, fuel system 100 can include a fuel tank pressure sensor 280 disposed in vehicle fuel tank 200 and configured to measure the internal pressure of vehicle fuel tank 200. Fuel tank pressure sensor 280 can be any suitable sensor for measuring internal tank pressure, for example, a gauge sensor, a capacitance sensor, a resistive sensor, and an ultrasonic sensor.

In some embodiments, fuel system 100 can include an accelerator pedal sensor 282 connected to an accelerator pedal 40 of vehicle 10. Accelerator pedal sensor 282 can be configured to measure and transmit a signal indicating the degree of inclination of accelerator pedal 40. Accelerator pedal sensor 282 can be any suitable sensor measuring the position of the accelerator pedal 40, for example, a non-contact inductive sensor.

In some embodiments, fuel system 100 can include a controller 290 in electrical communication with fuel pump 210, liquid fuel injectors 242, vapor fuel injectors 252, pressure regulator 260, and/or the plurality of sensors 270-282 to control the delivery and injection of vapor LP gas and liquid LP gas into the one or more combustion chambers 22 of engine 20. As further described below with reference to FIG. 6, controller 290 can include any suitable circuitry, processors, and/or memory (e.g., a microcomputer with a microprocessor, non-volatile memory, volatile memory, a counter, a signal processor, and an input/output interface) for storing computer readable instructions, data structures, program modules, and/or other data and executing the control operations, as described herein.

For example, controller 290 can be configured to selectively actuate fuel pump 210 by transmitting control signals to control output of fuel pump 210. Controller 290 can be configured to selectively actuate a solenoid valve in fuel pressure regulator 260 by transmitting control signals to regulate pressure or volume of vapor LP gas discharged from fuel pressure regulator 260. Controller 290 can be configured to actuate liquid fuel injectors 242 and vapor fuel injectors 252 by transmitting control signals to liquid fuel injectors 242 and vapor fuel injectors 252 to control the timing and/or duration of vapor and liquid injection. In some embodiments, controller 290 can modulate the pulse width of the control signals transmitted to fuel pump 210, liquid fuel injectors 242, vapor fuel injectors, and fuel pressure regulator 260.

In some embodiments, controller 290 can receive one or more signals (e.g., via a controller area network) from the plurality of sensors 270-282 to determine one or more operating conditions of vehicle 10.

For example, in some embodiments, controller 290 can configured to receive a signal from engine coolant sensor 270 indicating a temperature of engine coolant flowing to fuel pressure regulator 260. Controller 290 can be configured to determine if engine 20 is in a cold state or in a warm state based on engine coolant temperature measurement indicated by engine coolant sensor 270. For example, in some embodiments, controller 290 can determine engine 20 is in a cold state when the measured temperature of the engine coolant is below an engine coolant temperature threshold. Controller 290 can determine engine 20 is in a warm state when the measured temperature of the engine coolant is above the coolant temperature threshold. The engine coolant temperature threshold can vary based on several factors, such as the volumetric rating of engine 20, the location of the fuel injectors, and the composition mixture of LP gas in fuel system 100. In some embodiments, the engine coolant temperature threshold can be a temperature in a range from 70° F. to 140° F., such as from 86° F. to 122° F.

In some embodiments, controller 290 can be configured to receive a signal from MAP sensor 272 indicating an absolute pressure of air in intake manifold 12. Controller 290 can be configured to determine current load of engine 20 based on the absolute pressure measurement of air intake manifold 12, as indicated by MAP sensor 272, along with other inputs, such as engine speed, position of engine crank, and/or intake manifold temperature.

In some embodiments, controller 290 can be configured to receive a signal from first fuel rail sensor 274 indicating a temperature or pressure of liquid LP gas in first fuel rail 240. Controller 290 can determine the pulse width modulation or duty cycle for fuel pump 210 based on the measured temperature or pressure of liquid LP gas in first fuel rail 240 so that LP gas in first fuel rail 240 and first fuel supply line 220 remains in the liquid state.

In some embodiments, controller 290 can be configured to receive a signal from second fuel rail sensor 276 indicating a temperature or pressure vapor LP gas in second fuel rail 250. Controller 290 can be configured to determine the injection timing of vapor fuel injectors 252 based on the pressure or temperature of vapor LP gas in second fuel rail 250.

In some embodiments, controller 290 can be configured to receive a signal from fuel level sensor 278 indicating the amount of fuel in fuel tank 200. Controller 290 can be configured to receive a signal from fuel tank pressure sensor 280 indicating the internal pressure of fuel tank 200.

In some embodiments, controller 290 can be configured to receive a signal from accelerator pedal sensor 282 indicating the position of accelerator pedal 40 of vehicle 10. Controller 290 can be configured to determine a desired engine torque by the driver based on the detected position of accelerator pedal 40.

In some embodiments, controller 290 can be configured to determine the load demand of engine 20 based on the desired engine torque by the driver and the current load of engine 20. Controller 290 can calculate the desired engine torque based on the pedal position indicated by accelerator pedal sensor 282. Controller 290 can calculate the current load of engine 20 based on the absolute pressure of air in intake manifold 12, along with other inputs, such as, but not limited to, the engine speed, the intake manifold temperature, the air-fuel ratio, and/or the crank position. The current load of engine 20 can indicate the maximum available torque output of engine 20 based on the detected operating conditions. In some embodiments, controller 290 can determine the net torque adjustment for engine 20 based on the calculated load demand of engine 20. In some embodiments, controller 290 can calculate an engine load demand as a percentage of the net torque adjustment relative to the engine's maximum available torque output based on the current operating conditions. In some embodiments, controller 290 can calculate an engine load demand as a percentage of the measured current fuel flow rate relative to the predetermined maximum fuel flow rate at full throttle and same engine speed.

In some embodiments, controller 290 can be configured to determine an operating state of vehicle 10, such as whether vehicle 10 is accelerating, decelerating, cruising, or idling, based on the calculated load demand of engine 20. When determining that vehicle 10 is set in an accelerating state, controller 290 can also determine the degree of acceleration, such as a low, medium, and high acceleration rates, based on the calculated load demand of engine 20.

Figure 5:
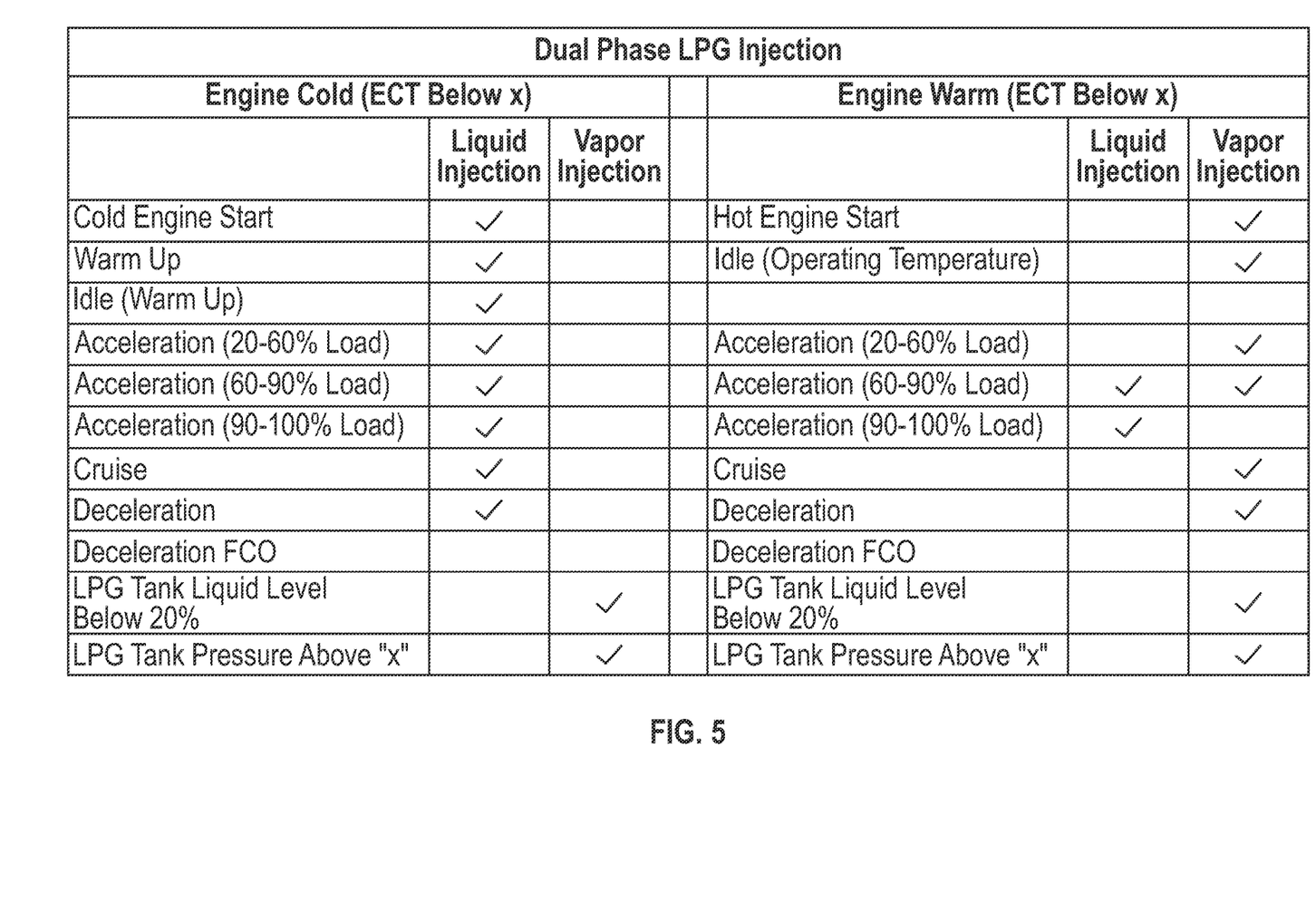
FIG. 5 is a table of control protocols associated with engine operating conditions of a fuel supply system, according to embodiments of the present disclosure.

In some embodiments, controller 290 can be configured to determine the desired phase of LP gas—vapor LP gas or liquid LP gas—for injecting into the one or more combustion chambers 22 of engine 20 based on the one or more detected operating conditions of vehicle 10. For example, FIG. 5 shows a table listing the predetermined phase of LP gas for various vehicle operating conditions to minimize the problems associated with both dedicated liquid LP gas fuel systems (e.g., unintended vaporization of liquid LP gas in the fuel rail, elevated pressures in the fuel tank, fuel pump failure, engine start delay during hot soak conditions) and dedicated vapor LP fuel systems (e.g., gasoline operation during engine cold starts, volumetric fuel inefficiency at high loads). The predetermined LP gas phases for the vehicle operation conditions listed in the table of FIG. 5 can be programmed in the memory of controller 290.

In some embodiments, as shown in FIG. 5, a first set of conditions for determining the desired LP gas phase can be based on the engine coolant temperature. The engine coolant temperature, as detected by engine coolant sensor 270, can indicate whether engine 20 is in a cold state or a warm state, including a cold engine start or a hot engine start. For example, engine 20 can be set in a warm state when the measured engine coolant temperature is above the engine coolant temperature threshold. Engine 20 can be set in a cold state when the measured engine coolant temperature is below the engine coolant temperature threshold. In some embodiments, the engine coolant temperature threshold can range from 86° F. to 122° F. In some embodiments, controller 290 can determine the desired LP gas phase based solely on the first set of conditions associated with the engine coolant temperature.

When determining that engine 20 is in a cold state, controller 290 can be configured to select liquid LP gas injection for the majority of the operating conditions, such as idle, acceleration, cruise, and deceleration, as listed in the table of FIG. 5. It is generally desirable to deliver liquid LP gas to combustion chambers 22 when engine 20 is in a cold state because fuel pressure regulator 260 relies on warmed engine coolant supplied by engine coolant line 30 to vaporize liquid LP gas fuel supplied from second fuel supply line 230. When engine 20 is started or operating in a cold state, the engine coolant supplied by engine coolant line 30 is generally not warm enough to effectively vaporize liquid LP gas fuel flowing through fuel pressure regulator 260. Delivering only liquid LP gas fuel to engine 20 through the first fuel supply line 220 avoids or minimizes the problems associated with using vapor LP gas fuel during the cold engine state.

When determining that engine 20 is in a warm state, controller 290 can be configured to select vapor LP gas injection for the majority of the operating conditions, such as idle, low and medium acceleration rates (e.g., when engine load demand is in a range from 60% to 90%), cruise, and deceleration, as listed in the table of FIG. 5. It is generally desirable to deliver vapor LP gas to combustion chambers 22 when engine 20 is in a warm state because the excess heat from engine 20 can inadvertently vaporize liquid LP gas in first fuel rail 240 before being injected by liquid fuel injectors 242. Delivering only vapor LP gas fuel to engine 20 through the second fuel supply line 230 and fuel pressure regulator 260 avoids or minimizes the problems associated with using liquid LP gas fuel during the warm engine state.

In some embodiments, as shown in FIG. 5, a second set of conditions for determining the desired LP gas phase can be based on the load demand of engine 20. The load demand of engine 20 can indicate the net torque output by engine 20 to meet the desired engine torque determined based on the position of accelerator pedal 40, as indicated by accelerator pedal sensor 282. For example, the load demand of engine 20 can be used to determine that vehicle 10 is in an idle state, an acceleration state, a cruise state, and/or a deceleration state. In some embodiments, the load demand of engine 20 can determine the degree of acceleration, including, but not limited to, low, medium, and high acceleration rates. For example, as shown in FIG. 5, a low acceleration rate corresponds to an engine load demand in a range from 20% to 60%. A medium acceleration rate corresponds to an engine load demand in a range from 60% to 90%. A high acceleration rate corresponds to an engine load demand in a range from 90% to 100%. In some embodiments, controller 290 can determine the desired LP gas phase based on both the first set of conditions associated with engine coolant temperature and the second set of conditions associated with the engine load demand.

While vapor LP gas injection is generally desirable during a hot engine state, controller 290 can be configured to select liquid LP gas injection for high engine load demands, such as, for example, medium and high acceleration rates (e.g., when engine load demand is in a range from 60% to 100%), even when the engine coolant temperature is above the engine coolant temperature threshold. It is generally desirable to deliver liquid LP gas to combustion chambers 22 to meet high engine load demands, despite the temperature of engine 20, because injecting vapor LP gas at high engine loads (e.g., during high engine speeds) typically displaces air intake from combustion chambers 22, resulting in incomplete air charges. Delivering liquid LP gas fuel to engine 20 through the first fuel supply line 220 avoids or minimizes the problems associated with injecting vapor LP gas at high engine load demands.

In some embodiments, as shown in FIG. 5, a third set of conditions for determining the desired LP gas phase can be based on the liquid LP gas fuel level in vehicle fuel tank 200 or first fuel tank 300 or the internal pressure of vehicle fuel tank 200 or first fuel tank 300, as indicated by fuel level sensor 278 and fuel tank pressure sensor 280, respectively. In some embodiments, controller 290 can determine the desired LP gas phase based solely on the third set of conditions associated with fuel level and fuel tank pressure. In some embodiments, controller 290 can determine the desired LP gas phase based on the first set of conditions associated with engine coolant temperature and the third set of conditions associated with fuel level and fuel tank pressure. In some embodiments, controller 290 can determine the desired LP gas phase based on the first set of conditions associated with engine coolant temperature, the second set of conditions associated with load demand, and the third set of conditions associated with fuel level and fuel tank pressure. In some embodiments, controller 290 can determine the desired LP gas phase based on the second set of conditions associated with load demand and the third set of conditions associated with fuel level and fuel tank pressure.

While liquid LP gas injection is generally desirable during a cold engine state and high engine load demands, controller 290 can be configured to select vapor LP gas injection when the measured liquid LP gas fuel level falls below a fuel level threshold, such as, for example, when the volume of liquid LP gas fuel is below 20% of the total internal volume of vehicle fuel tank 200. It is generally desirable to deliver vapor LP gas to combustion chambers 22 when liquid LP gas fuel level is low (e.g., below 20% of total internal volume of vehicle fuel tank), despite the temperature or load demand of engine 20, because delivering liquid LP gas at low fuel levels can lead to pump overheating. Delivering vapor LP gas fuel to engine 20 through the second fuel supply line 230 and fuel pressure regulator 260 avoids or minimizes the problems associated with operating fuel pumps at low liquid LP fuel levels.

While liquid LP gas injection is generally desirable during a cold engine state and high engine load demands, controller 290 can be configured to select vapor LP gas injection when the internal pressure of vehicle fuel tank 200 rises above a tank pressure threshold. In some embodiments, the tank pressure threshold can range from 270 psig to 300 psig, such as, for example, 285 psig. It is generally desirable to deliver vapor LP gas to combustion chambers 22 when the internal pressure of vehicle fuel tank 200 is high, despite the temperature or load demand of engine 20, because delivering liquid LP gas while fuel tank pressure is high can lead to difficulty in refueling or tank pressures exceeding maximum allowable working pressure of the tank. Delivering vapor LP gas fuel to engine 20 through second fuel supply line 230 and fuel pressure regulator 260 avoids or minimizes the problems associated with operating at high fuel tank pressure.

In some embodiments, other operating conditions for determining the desired phase of LP gas can be the temperature and/or pressure of liquid LP gas in first fuel rail 240 and the temperature or pressure of vapor LP gas in second fuel rail 250. For example, in some embodiments, if the temperature of first fuel rail 240 is high enough that would likely lead to inadvertent vaporization of liquid LP gas in first fuel rail 240, controller 290 can be configured to only deliver vapor LP gas fuel to engine 20 through second fuel supply line 230 to increase efficiency of combustion in engine 20. In some embodiments, if the pressure of first fuel rail 240 is low enough that would likely lead to inadvertent vaporization of liquid LP gas in first fuel rail 240, controller 290 can be configured to only deliver vapor LP gas fuel to engine 20 through second fuel supply line 230 to increase efficiency of combustion in engine 20.

In some embodiments, after determining the desired phase of LP gas for fuel injection, controller 290 can selectively actuate delivery of vapor LP gas and/or liquid LP gas to the one or more combustion chambers 22 of engine 20 by controlling at least one of fuel pump 210, liquid fuel injectors 242, vapor fuel injectors 252, and fuel pressure regulator 260. For example, after selecting liquid LP gas injection, controller 290 can actuate fuel pump 210 to deliver liquid LP gas fuel to liquid fuel injectors 242 by transmitting controls signals according to pulse width modulation to control output of fuel pump 210. Controller 290 can control timing or the volume of liquid LP gas fuel injection by transmitting control signals according to pulse width modulation to liquid fuel injectors 242. After selecting vapor LP gas injection, controller 290 can actuate fuel pressure regulator 260 to vaporize liquid LP gas supplied by second fuel supply line 230 by transmitting control signals according to pulse width modulation to fuel pressure regulator 260. Controller 290 can control timing or the volume of vapor LP gas fuel injection by transmitting control signals according to pulse width modulation to vapor fuel injectors 252.

Figure 4:
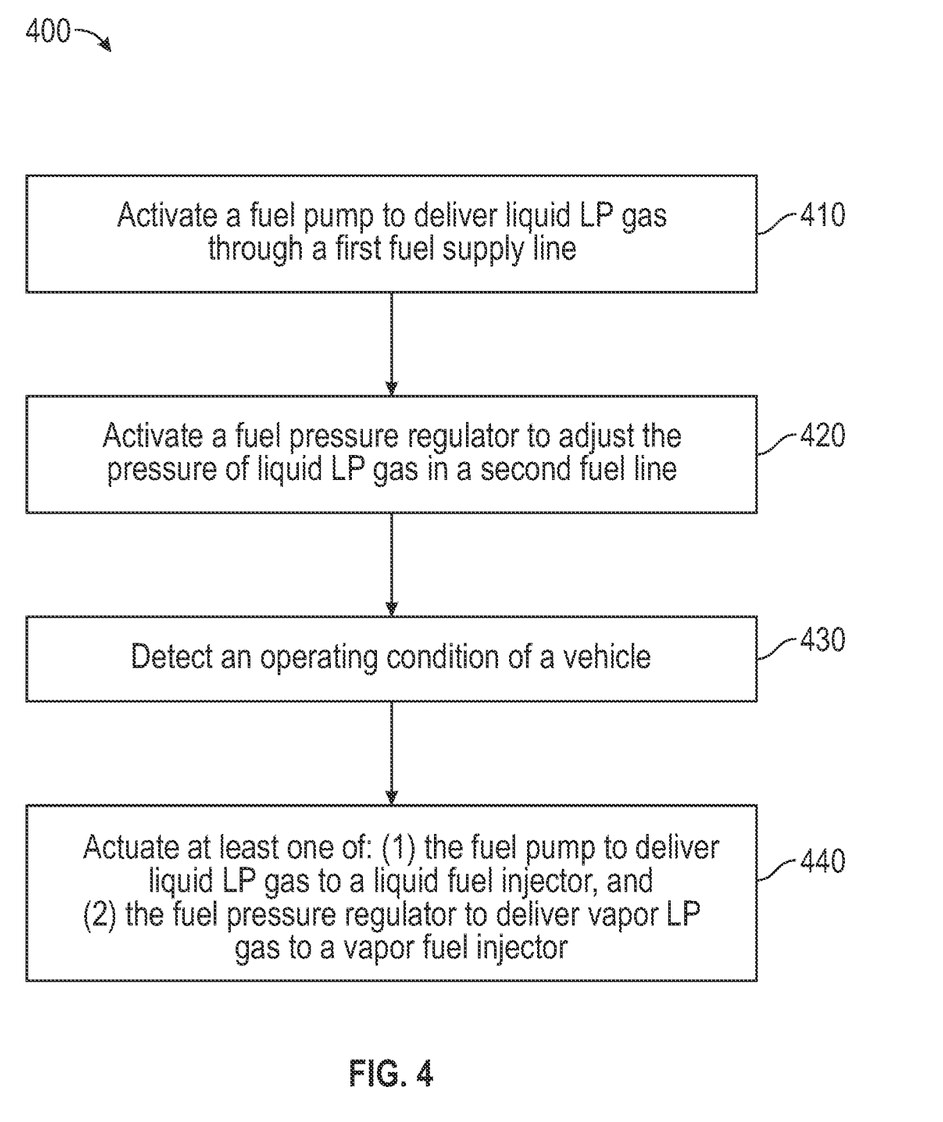
FIG. 4 is a flow chart of a method for supplying fuel to an internal combustion engine, according to embodiments of the present disclosure.

FIG. 4 shows an example block diagram illustrating aspects of a method 400 of controlling fuel system 100 in vehicle 10, by a controller, for example, controller 290. One or more aspects of method 400 can be implemented using hardware, software modules, firmware, tangible computer readable media having instructions stored thereon, or a combination thereof.

In some embodiments, method 400 can include a step 410 of activating fuel pump 210 to deliver liquid LP gas through first fuel supply line 220. In some embodiments, step 410 can include transmitting a control signal to fuel pump 210 to displace liquid LP gas fuel stored in vehicle fuel tank 200 or fuel tank 300 to liquid fuel delivery system 130.

In some embodiments, method 400 can include a step 420 of activating fuel pressure regulator 260 to adjust the pressure of liquid LP gas in second fuel supply line 230. In some embodiments, step 420 can include transmitting a control signal to fuel pressure regulator 260 to adjust the pressure of liquid LP gas supplied by first section 232 of second fuel supply line 230 such that liquid LP gas is vaporized and discharged through second section 234 of second fuel supply line 230. In some embodiments, step 420 can include adjusting the pressure of liquid LP gas in second fuel supply line 230 to a setpoint pressure in a range from 500 mbar to 2500 mbar, such that LP gas entering second fuel rail 250 is at a low pressure vapor state.

In some embodiments, method 400 can include a step 430 of detecting an operating condition of vehicle 10. In some embodiments, the vehicle operating condition detected in step 430 can include at least one of a load demand of engine 20, a temperature measurement of engine coolant line 30, a fuel level measurement of liquid LP gas stored in vehicle fuel tank 200 or first vehicle fuel tank 300, and an internal pressure measurement of vehicle fuel tank 200 or first vehicle fuel tank 300.

In some embodiments, step 430 can include detecting the engine coolant temperature in engine coolant line 30 being supplied to fuel pressure regulator 260 by receiving a signal from engine coolant sensor 270. In some embodiments, step 430 can include determining whether engine coolant temperature is above or below an engine coolant temperature threshold. In some embodiments, step 430 can include determining whether engine 20 is in a hot state or cold state based on the engine temperature measurement with respect to the engine coolant temperature threshold.

In some embodiments, step 430 can include determining the load demand of engine 20 based on the desired engine torque by the driver and the current load of engine 20. In some embodiments, step 430 can include determining the desired engine torque by receiving a signal from accelerator pedal sensor 282 indicating the position of accelerator pedal 40. In some embodiments, step 430 can include calculating the current load of engine 20 based on an absolute pressure measurement of intake manifold 12 indicated by MAP sensor 272.

In some embodiments, step 430 can include determining the liquid LP gas fuel level stored in vehicle fuel tank 200 or first vehicle fuel tank 300 by receiving a signal from fuel level sensor 278. In some embodiments, step 430 can include determining whether the measured liquid LP gas fuel level is below or above a fuel level threshold. In some embodiments, step 430 can include detecting the internal pressure of vehicle fuel tank 200 or first vehicle fuel tank 300 by receiving a signal from tank pressure sensor 280. In some embodiments, step 430 can include determining whether the measured tank internal pressure is below or above a tank pressure threshold.

In some embodiments, method 400 can include a step 440 of actuating, based on the detected operating condition, at least one of: (1) fuel pump 210 to deliver liquid LP gas to liquid fuel injectors 242 to inject liquid LP gas into one or more combustion chambers 22 of engine 20, and (2) fuel pressure regulator 260 to deliver vapor LP gas to vapor fuel injectors 252 to inject vapor VP gas into one or more combustion chambers 22 of engine 20. In some embodiments, step 440 can include actuating fuel pump 210 by modulating the pulse width of control signals transmitted to pump 210 to adjust the pressure of liquid LP gas delivered to first fuel rail 240. In some embodiments, step 440 can include actuating fuel pressure regulator by modulating the pulse width of control signals transmitted to a valve (e.g., solenoid valve) of fuel pressure regulator 260 to control the volume or pressure of vapor LP gas delivered to second fuel rail 250.

In some embodiments, step 440 can include actuating fuel pump 210 to deliver liquid LP gas to liquid fuel injectors 242 when the detected operation condition indicates the temperature measurement of the engine coolant line 30 is below a coolant temperature threshold. In some embodiments, step 440 can include actuating fuel pressure regulator 260 to deliver vapor LP gas to vapor fuel injectors 252 when the detected operation condition indicates the temperature measurement of the engine coolant line 30 is above a coolant temperature threshold.

In some embodiments, step 440 can include actuating fuel pump 210 to deliver liquid LP gas to liquid fuel injectors 242 when the detected operating condition indicates the load demand of engine 20 is above an engine load threshold. Load demand of engine 20 can exceed an engine load threshold when vehicle 10 is accelerating at a medium or a high rate. In some embodiments, step 440 can include actuating fuel pressure regulator 260 to deliver vapor LP gas to vapor fuel injectors 252 when the detected operating condition indicates the load demand of engine 20 is below an engine load threshold. Load demand of engine 20 can fall below an engine load threshold when vehicle 10 is in idling, cruising, and/or accelerating at a low rate.

In some embodiments, step 440 can include actuating fuel pump 210 to deliver liquid LP gas to liquid fuel injectors 242 when the detected operating condition indicates the fuel level measurement of liquid LP gas stored in fuel tank 200 or fuel tank 300 is above a fuel level threshold. In some embodiments, step 440 can include actuating fuel pressure regulator 260 to deliver vapor LP gas to vapor fuel injectors 252 when the detected operating condition indicates the fuel level measurement of liquid LP gas stored in fuel tank 200 or first fuel tank 300 is below a fuel level threshold.

In some embodiments, step 440 can include actuating fuel pump 210 to deliver liquid LP gas to liquid fuel injectors 242 when the detected operating condition indicates the internal pressure measurement of vehicle fuel tank 200 or first vehicle fuel tank 300 is below a tank pressure threshold. In some embodiments, step 440 can include actuating fuel pressure regulator 260 to deliver vapor LP gas to vapor fuel injectors 252 when the detected operating condition indicates the internal pressure measurement of vehicle fuel tank 200 or first vehicle fuel tank 300 is above a tank pressure threshold.

In some embodiments, step 440 can include controlling the injection timing or injection duration of at least one of liquid fuel injectors 242 and vapor fuel injectors 252. For example, step 440 can include adjusting the injection timing of vapor fuel injectors 252 based on the pressure or temperature measurement indicated by second fuel rail sensor 276 and the absolute pressure of air in intake manifold 12. In some embodiments, step 440 can include controlling the injection duration of liquid fuel injectors 242 by modulating the pulse width of the control signals transmitted to pump 210.

Figure 6:
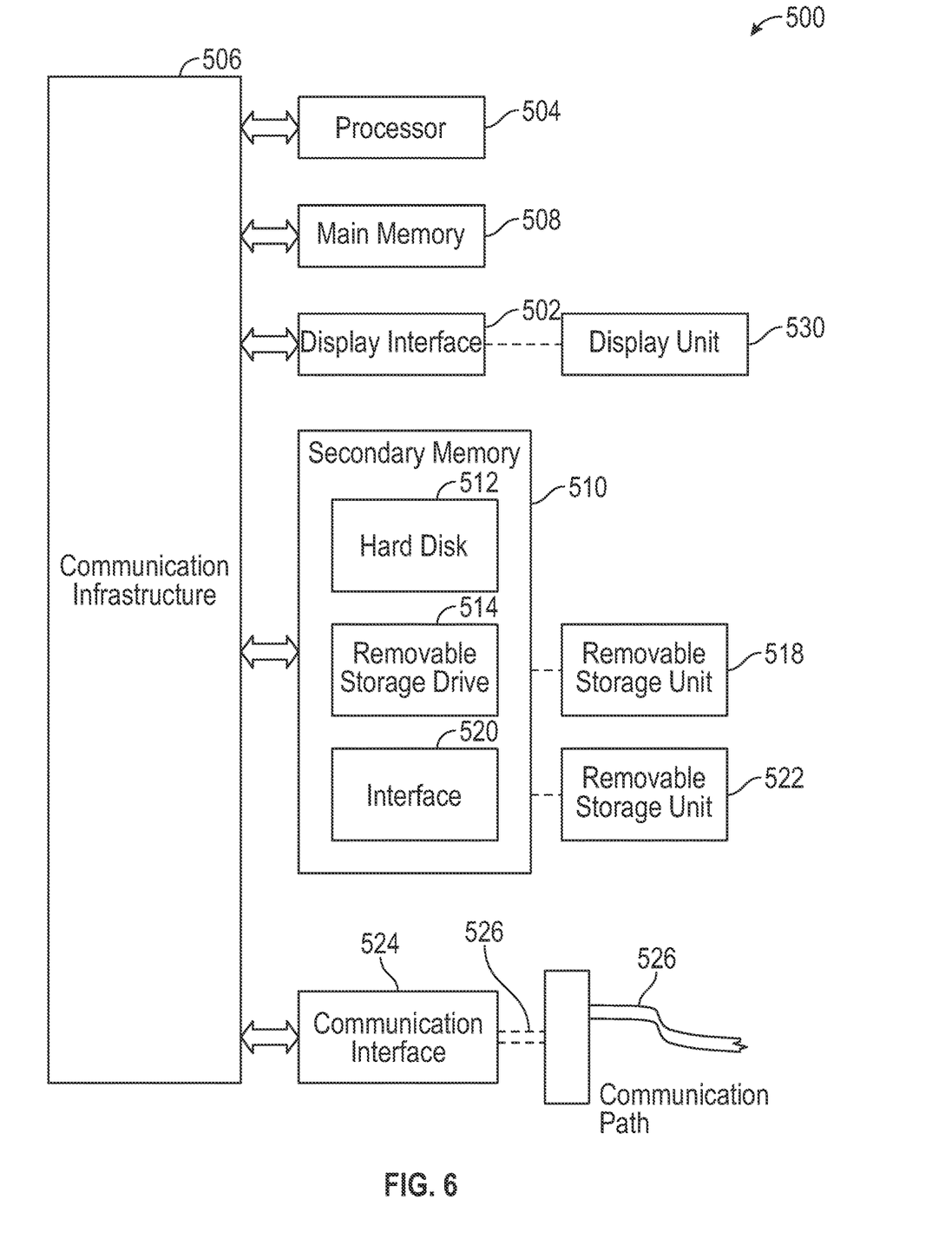
FIG. 6 is a block diagram showing aspects of a computer system according to embodiments of the present disclosure.

In some embodiments, controller 290 can include a computer system, such as a computer system 500 shown in FIG. 6, to execute the operations and the methods (e.g., method shown in FIG. 4) described herein. Portions of computer system 500 can be implemented as computer-readable code.

If programmable logic is used, such logic can execute on a commercially available processing platform or a special purpose device. One of ordinary skill in the art can appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that can be embedded into virtually any device.

For instance, at least one processor device and a memory can be used to implement the above described embodiments. A processor device can be a single processor, a plurality of processors, or combinations thereof. Processor devices can have one or more processor "cores."

Embodiments of the present disclosure may be implemented in terms of this example computer system 500. After reading this description, it will become apparent to a person skilled in the relevant art how to implement one or more aspects of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, or removable storage drive 514. Removable storage drive 514 may include a floppy disk drive, a magnetic tape drive, an optical disk drive, a flash memory, a Universal Serial Bus (USB) drive, or the like. The removable storage drive 514 reads from and/or writes to a removable storage unit 518 in a well-known manner. Removable storage unit 518 may include a floppy disk, magnetic tape, optical disk, etc. which is read by and written to by removable storage drive 514. As will be appreciated by persons skilled in the relevant art, removable storage unit 518 includes a computer usable storage medium having stored therein computer software and/or data.

Computer system 500 may include a display interface 502 (which can include input and output devices such as graphical user interface) that forwards graphics, text, and other data from communication infrastructure 506 (or from a frame buffer not shown) for display on display unit 530.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface, a removable memory chip (such as an EPROM, or PROM) and associated socket, and other removable storage units 522 and interfaces 520 which allow software and data to be transferred from the removable storage unit 522 to computer system 500.

Computer system 500 may also include a communication interface 524. Communication interface 524 allows software and data to be transferred between computer system 500 and external devices. Communication interface 524 may include a modem, a network interface (such as an Ethernet card), a communication port, a PCMCIA slot and card, or the like. Software and data transferred via communication interface 524 may be in the form of signals, which may be electronic, electromagnetic, optical, or other signals capable of being received by communication interface 524. These signals may be provided to communication interface 524 via a communication path 526. Communication path 526 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g., DRAMs, etc.).

Computer programs (also called computer control logic) are stored in main memory 508 and/or secondary memory 510. Computer programs may also be received via communication interface 524. Such computer programs, when executed, enable computer system 500 to implement the embodiments as discussed herein. In particular, the computer programs, when executed, enable processor device 504 to implement the processes of the embodiments discussed herein. Accordingly, such computer programs represent controllers of the computer system 500. Where the embodiments are implemented using software, the software may be stored in a computer program product and loaded into computer system 500 using removable storage drive 514, interface 520, and hard disk drive 512, or communication interface 524.

Embodiments of the present disclosure also may be directed to computer program products comprising software stored on any computer useable medium. Such software, when executed in one or more data processing device, causes a data processing device(s) to operate as described herein. Embodiments of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be appreciated that the Detailed Description section, and not the Brief Summary and Abstract sections, is intended to be used to interpret the claims. The Brief Summary and Abstract sections may set forth one or more, but not all embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described embodiments, but should be defined only in accordance with the following claims and their equivalents.

What is claimed is:

1. A liquefied petroleum (LP) gas fuel system for an internal combustion engine of a vehicle, comprising:
    a fuel tank configured to store a liquid LP gas;
    a fuel supply system configured to draw the liquid LP gas from the fuel tank and deliver a vapor LP gas and the liquid LP gas into a plurality of cylinders of the internal combustion engine, the fuel supply system comprising:
        a plurality of liquid injectors each configured to inject the liquid LP gas into a respective cylinder of the internal combustion engine,
        a plurality of vapor injectors each configured to inject the vapor LP gas into a respective cylinder of the internal combustion engine,
        a fuel pump configured to displace the liquid LP gas fuel from the fuel tank to the plurality of liquid injectors, and
        a fuel pressure regulator configured to adjust the pressure of the liquid LP gas released from the fuel tank such that the released liquid LP gas is converted to the vapor LP gas, and the fuel pressure regulator configured to deliver the vapor LP gas to the plurality of vapor injectors;
    an engine coolant temperature sensor configured to indicate a temperature measurement of an engine coolant line;
    a fuel level sensor disposed in the fuel tank, wherein the fuel level sensor is configured to indicate a fuel level measurement of the liquid LP gas in the fuel tank; and
    a controller configured to determine a load demand of the internal combustion engine and receive the temperature measurement of the engine coolant line from the engine coolant temperature sensor and the fuel level measurement of the liquid LP gas in the fuel tank from the fuel level sensor, and the controller is configured to actuate the fuel pressure regulator to deliver the vapor LP gas to the plurality of vapor injectors and actuate the fuel pump to deliver the liquid LP gas to the plurality of liquid injectors,
    wherein the controller is configured to selectively actuate the fuel pressure regulator and the fuel pump based on at least one of the load demand of the internal combustion engine, the temperature measurement of the engine coolant line, and the fuel level measurement,
    wherein the controller is configured to actuate the fuel pump to deliver the liquid LP gas to the plurality of liquid injectors when the fuel level measurement is above a fuel level threshold, and the controller is configured to actuate the fuel pressure regulator to deliver the vapor LP gas to the plurality of vapor injectors when the fuel level measurement is below the fuel level threshold, and
    wherein the controller is configured to actuate the fuel pump to deliver the liquid LP gas to the plurality of liquid injectors when the temperature measurement of the engine coolant line is above an engine coolant temperature threshold and the load demand is above an engine load threshold.

2. The fuel system of claim 1, wherein the controller is configured to actuate the fuel pump to deliver the liquid LP gas to the plurality of liquid injectors when the temperature measurement of the engine coolant line is below the engine coolant temperature threshold, and the controller is configured to actuate the fuel pressure regulator to deliver the vapor LP gas to the plurality of vapor injectors when the temperature measurement of the engine coolant line is above the engine coolant temperature threshold and the load demand is below the engine load threshold.

3. The fuel system of claim 2, wherein the engine coolant temperature threshold is in a range from 86° F. to 122° F.

4. The fuel system of claim 1, wherein fuel supply system further comprises:
    a first fuel rail coupled to the plurality of liquid injectors; and
    a second fuel rail coupled to the plurality of vapor injectors.

5. The fuel system of claim 4, wherein the fuel tank comprises a single fuel tank, and the fuel supply system comprises:
    a first fuel supply line fluidly coupled to the fuel tank and to first fuel rail, wherein the fuel pump is configured to displace the liquid LP gas through the first fuel supply line; and
    a second fuel supply line fluidly coupled to the fuel tank and to the second fuel rail, wherein the fuel pressure regulator is coupled to the second fuel supply line.

6. The fuel system of claim 5, wherein the fuel supply system comprises a return fuel line fluidly coupled to the first fuel rail and the fuel tank.

7. The fuel system of claim 4, wherein the fuel tank comprises:
    a first fuel tank configured to store the liquid LP gas, and a second fuel tank configured to store the liquid LP gas, and wherein the fuel supply system comprises:
   a first fuel supply line fluidly coupled to the first fuel tank and to first fuel rail, wherein the fuel pump is configured to drive the liquid LP gas through the first fuel supply line, and
   a second fuel supply line fluidly coupled to the second fuel tank and to the second fuel rail, wherein the fuel pressure regulator is coupled to the second fuel supply line.

8. The fuel system of claim 7, wherein the fuel supply system comprises a return fuel line fluidly coupled to the first fuel rail and the first fuel tank.

9. The fuel system of claim 1, wherein the engine coolant temperature sensor is disposed at the fuel pressure regulator or at one of the plurality of cylinders of the internal combustion engine.

10. The fuel system of claim 1, wherein the controller is configured to actuate the pressure regulator to deliver the vapor LP gas to the plurality of vapor injectors when the temperature measurement of the engine coolant line is above the engine coolant temperature threshold and the load demand is below the engine load threshold.

11. The fuel system of claim 1, wherein the fuel pump is disposed in the fuel tank.

12. The fuel system of claim 1, further comprising a tank pressure sensor disposed in the fuel tank, wherein the tank pressure sensor is configured to indicate a tank pressure measurement of the fuel tank, and wherein the controller is configured to receive the tank pressure measurement from the tank pressure sensor and actuate the fuel pressure regulator to deliver the vapor LP gas to the plurality of vapor injectors when the tank pressure measurement is above a tank pressure threshold.

13. The fuel system of claim 1, wherein the fuel level threshold is 20% of a total internal volume of the fuel tank.

14. A method for delivering liquefied petroleum (LP) gas to an internal combustion engine of a vehicle, comprising:
   activating a fuel pump to deliver a liquid LP gas through a first fuel supply line;
   activating a fuel pressure regulator to adjust the pressure of the liquid LP gas in a second fuel supply line such that the liquid LP gas in the second fuel supply line is converted to a vapor LP gas;
   detecting an operating condition of the vehicle; and
   actuating, based on the detected operating condition of the vehicle, at least one of: (1) the fuel pump to deliver the liquid LP gas to a liquid injector to inject the liquid LP gas into a cylinder of the internal combustion engine, and (2) the fuel pressure regulator to deliver the vapor LP gas to a vapor injector to inject the vapor VP gas into the cylinder of the internal combustion engine, wherein the operating condition of the vehicle includes at least one of a load demand of the internal combustion engine, a temperature measurement of an engine coolant line, and a fuel level measurement of the liquid LP gas in a fuel tank of the vehicle,
   wherein actuating at least one of the fuel pump and the fuel pressure regulator comprises actuating the fuel pressure regulator to deliver vapor LP gas to the vapor injector when the detected operating condition indicates the fuel level measurement is below a fuel level threshold and the temperature measurement of the engine coolant line is below an engine coolant temperature threshold.

15. The method of claim 14, wherein detecting the operating condition indicates the temperature measurement of the engine coolant line is below the coolant temperature threshold, and actuating at least one of the fuel pump and the fuel pressure regulator comprises actuating the fuel pump to deliver the liquid LP gas to the liquid injector.

16. The method of claim 14, wherein detecting the operating condition indicates the temperature measurement of the engine coolant line is above the coolant temperature threshold and the load demand is below the engine load threshold, and actuating at least one of the fuel pump and the fuel pressure regulator comprises actuating the fuel pressure regulator to deliver the vapor LP gas to the vapor injector.

17. The method of claim 14, wherein detecting the operating condition indicates the load demand is above an engine load threshold, and actuating at least one of the fuel pump and the fuel pressure regulator comprises actuating the fuel pump to deliver the liquid LP gas to the liquid injector.

18. The method of claim 14, wherein detecting the operating condition indicates the load demand is below an engine load threshold, and actuating at least one of the fuel pump and the fuel pressure regulator comprises actuating the fuel pressure regulator to deliver the vapor LP gas to the vapor injector.

19. The method of claim 14, wherein detecting the operating condition indicates the fuel level measurement is above a fuel level threshold, and actuating at least one of the fuel pump and the fuel pressure regulator comprises actuating the fuel pump to deliver the liquid LP gas to the liquid injector.

20. The method of claim 14, wherein actuating at least one of the fuel pump and the fuel pressure regulator comprises actuating the fuel pump to deliver the liquid LP gas to the plurality of liquid injectors when the temperature measurement of the engine coolant line is above an engine coolant temperature threshold and the load demand is above an engine load threshold.

* * * * *